US 6,178,173 B1

(12) United States Patent
Mundwiler et al.

(10) Patent No.: US 6,178,173 B1
(45) Date of Patent: Jan. 23, 2001

(54) SYSTEM AND METHOD FOR COMMUNICATING PRE-CONNECT INFORMATION IN A DIGITAL COMMUNICATION SYSTEM

(75) Inventors: Richard Mundwiler, Safety Harbor; Mark Gaffin, Valrico, both of FL (US)

(73) Assignee: Paradyne Corporation, Largo, FL (US)

(*) Notice: Under 35 U.S.C. 154(b), the term of this patent shall be extended for 0 days.

(21) Appl. No.: 08/887,859

(22) Filed: Jul. 3, 1997

Related U.S. Application Data (60) Provisional application No. 60/034,391, filed on Dec. 30, 1996.

(51) Int. Cl.[7] .............................. H04L 12/28; H04M 3/48
(52) U.S. Cl. ......................... 370/410; 379/209; 370/524
(58) Field of Search ...................... 370/462, 522, 370/524, 410; 379/88.12, 100.15, 100.17, 142, 208, 196, 245, 374, 396, 911, 231–234, 209; 358/438, 435, 440

(56) References Cited

U.S. PATENT DOCUMENTS

| | | | | |
|---|---|---|---|---|
| 5,220,599 | * | 6/1993 | Sasano et al. | 379/142 |
| 5,463,683 | * | 10/1995 | Collins et al. | 379/201 |
| 5,509,062 | * | 4/1996 | Carlsen | 379/210 |
| 5,515,418 | * | 5/1996 | Yamaguchi et al. | 379/34 |
| 5,521,719 | * | 5/1996 | Yamada | 358/428 |
| 5,555,294 | * | 9/1996 | Abe | 379/100.15 |
| 5,608,788 | * | 3/1997 | Demlow et al. | 379/142 |

* cited by examiner

Primary Examiner—Chau Nguyen
Assistant Examiner—Chiho Andrew Lee
(74) Attorney, Agent, or Firm—Thomas, Kayden, Horstemeyer & Risley, L.L.P (57) ABSTRACT

The present invention is directed to method, and associated system, for communicating pre-connect information between a calling endpoint and a called endpoint in an Integrated Services Digital Network (ISDN) system. In accordance with one aspect of the present invention, the method includes the steps of dialing the called endpoint from the calling endpoint, and setting a calling party's subaddress information element to a value that allows the contents of a subaddress information field to be user specified. The method further includes the steps of specifying the contents of the subaddress information field, and transmitting the message of information to the called endpoint, the message of information including the calling party's subaddress information element. In accordance with the preferred embodiment of the invention, the system is a digital communication system that is compatible with the Open Systems Interconnection (OSI) seven layer model in communication at the network layer of the OSI model is defined by ITU-T Q.931 specification. As defined by that specification, the subaddress information element can be user-defined by a subaddress specifying field, which is a three-bit field. The subaddress information element, itself, is encoded to define a message of information that includes information as to why the calling endpoint is placing the call. This information can include reasons such as the requested call is a dialed backup link, it is a forwarding or redirected call, it is informing the called party that a previously received call placed by the called end point was interrupted do to a fault condition on the interconnecting network link, etc. As is defined by the ISDN's specification, the foregoing information and information specifying elements are contained within a call SETUP message.

12 Claims, 6 Drawing Sheets

Bits

| 8 | 7 | 6 | 5 | 4 | 3 | 2 | 1 | Octets |
|---|---|---|---|---|---|---|---|---|
| colspan=8: Protocol Discriminator  70 | | | | | | | | 1 |
| 0 | 0 | 0 | 0 | colspan=4: Length of Call Reference Value (in Octets) | | | | 2 |
| colspan=8: Call Reference Value  72 | | | | | | | | 3 |
| 0 | colspan=7: Message Type  74 | | | | | | | etc. |
| colspan=8: Other Information Elements as Required | | | | | | | | |

FIG. 3A

Bits

| 8 | 7 | 6 | 5 | 4 | 3 | 2 | 1 | Octets |
|---|---|---|---|---|---|---|---|---|
| 0 | 1 | 1 | 0 | 1 | 1 | 0 | 1 | 1 |
| | colspan=7: Calling Party Subaddress Information Element Identifier | | | | | | | |
| colspan=8: Length of Calling Party Subaddress Contents | | | | | | | | 2 |
| 1 ext. | colspan=3: Type of Subaddress | Odd/Even | 0 | 0 Spare | 0 | 3 |
| colspan=8: 82  Subaddress Information | | | | | | | | etc. |

| SType | SLength | Type-Specific Information  85 |
|---|---|---|
| 83 | 84 | |

SYSTEM AND METHOD FOR COMMUNICATING PRE-CONNECT INFORMATION IN A DIGITAL COMMUNICATION SYSTEM

CROSS-REFERENCE TO RELATED APPLICATIONS

This application claims the benefit of U.S. Provisional Patent Application Ser. No. 60/034,391, filed on Dec. 30, 1996, and entitled ISDN Virtual Out of Band Signaling Mechanism.

BACKGROUND OF THE INVENTION

1. Field of the Invention

The present invention generally relates to digital communication systems, and more particularly to a system and method for communicating pre-connection information in a digital communication system.

2. Discussion of the Related Art

Since the first T-Carrier system was introduced into commercial service by AT&T in 1962, Integrated Digital Networks (IDN's) have continually evolved, primarily driven by the need to provide economic voice (and data) communications. One such IDN is called the Integrated Services Digital Network (ISDN), which combines the coverage of the telephone network with the data-carrying capacity of digital data networks. In this regard, the term integrated refers to the ability to simultaneously carry digitized voice and data on the same digital transmission link, and through the same digital exchanges.

Standards for ISDN have been defined by the International Telecommunication Union (ITU), Telecommunication Standardization Sector (ITU-T). The ITU-T (formerly CCITT) recommendation I.120 defines both the principals of ISDN, as well as the evolution of ISDNs. In this regard, the main feature of the ISDN concept is the support of a wide range of voice and nonvoice applications in the same network. A key element of the service integration for an ISDN is the provision of a range of services using a limited set of connection types and multipurpose user-network interface arrangements. ISDNs support a variety of applications, including both switched (circuit switched and packet switched) and nonswitched connections. New services introduced into an ISDN should be compatible with the 65 kilobits per second switched digital connections. An ISDN is to be structured in accordance with a layered protocol that can be mapped into the seven-layer Open Systems Interconnection (OSI) model. In regard to the evolution of ISDNs, the ITU-T recommendation I.120 provides that ISDNs will be based on the concepts developed for telephone IDNs and may evolve by progressively incorporating additional functions and network features, including those of any other dedicated networks, such as circuit switching and packet switching.

The further development of ISDN is governed by a set of recommendations issued by ITU-T, called the I Series Recommendations. First issued in 1984, a more complete set of these recommendations has now been issued, and is centered on three primary areas. These include the standardization of services offered to users, the standardization of user-network interfaces, and the standardization of ISDN capabilities.

The foregoing has been presented merely for purposes of introduction, since the background and evolution of ISDNs is well known and documented. Suffice it to say that ISDN provides a very robust communication network in regard to both speed and flexibility. In general, the transmission structure of an ISDN is defined by B and D channels. The B channel is a user channel that can be utilized to transmit data, encoded digital voice, or a mixture of the two. The B channel is defined by a transmission rate of 64 kilobits per second. Furthermore, the B channel can support three types of connections: circuit-switched, packet-switched, and semi-permanent. The circuit-switched connection is established with another network user, when a first user places a call. In a packet-switched connection, a user is connected to a packet switching node, and data is exchanged with one or more other users in accordance with the X.25 protocol standard. Semi-permanent connections (sometimes referred to as permanent virtual circuits) are connections set up between users in accordance with the prior arrangement, and do not require a call establishment protocol.

The D channel is used for signaling and control. In this regard, the D channel carries common channel signaling information to control circuit-switched calls on associated B channels. It may also be used for packet switching or low speed telemetry, if no signaling or control information is otherwise waiting for transmission.

Using these two types of channels (which are time division multiplexed), ISDN provides both a basic access, and a primary access. The basic access is defined by two full-duplex B channels and one full-duplex D channel. The control and signaling information carried on the D channel provides the control and signaling for both of the B channels. ISDN primary access is generally directed for systems with greater capacity requirements, such as local area networks, multi-branch exchanges, etc. The primary access ISDN is typically based upon either a 1.544 mega bit per second transmission structure (corresponding to the T1 transmission structure) or a 2.048 mega bit per second transmission structure (based upon the European standard). Typically, the channel structure for the primary access ISDN is 23B channels plus one 64 kilobit per second D channel (for the 1.544 mega bit per second structure), or 30B channels plus one 64 kilobit per second D channel (for the 2.048 mega bit per second structure).

As previously mentioned, ISDN is defined in accordance with the layered protocol of the OSI model. Layer one, or the physical layer, functions to encode digital data for transmission, ensure full-duplex transmission of B and D channel data, multiplexes the channels to form either basic or primary access transmissions, and other known functions. Layer two, or the data link layer, establishes a protocol that is needed for communication. The ITU-T has defined a data link control protocol for the D channel, known as Length Access Protocol D channel or LAPD. LAPD is defined by ITU-T recommendation Q.921. Operating above the LAPD, is layer 3, or the network layer. The ITU-T recommendation Q.931 defines a network-layer protocol, which makes use of the D channel and defines the procedures for establishing, maintaining, and clearing of network connections at the ISDN user-network interface.

In accordance with the foregoing standards and protocols, a variety of information is exchanged between a calling party and a called party in an ISDN, prior to the establishment of the connection between the two parties. In this regard, the Q.931 recommendation defines a number of call establishment messages that exchange information prior to the establishment of the connection. These messages include: ALERTING, CALL PROCEEDING, CONNECT, CONNECT ACKNOWLEDGE, PROGRESS, SETUP, AND SETUP ACKNOWLEDGE.

By way of example, the SETUP MESSAGE includes a variety of information elements. One such element is the calling party number and calling party subaddress. As is known, this information is placed into the set up message at the first local exchange (i.e., the local exchange nearest the calling party). The calling party number identifies the telephone number of the calling party. Therefore, upon receiving the SETUP message, the called party may evaluate the calling party number to determine the identity of the calling party. The subaddress information is used to identify address information internal to the calling party. For example, if the call originates from a private branch exchange (PBX) or a local area network, the subaddress information element may be used to identify a particular extension or terminal at the calling party premises.

It is appreciated that, based upon information such as the calling party number, a called party may choose to, for example, accept or decline the incoming call. In this regard, if the called party wishes to accept the incoming call, it will then issue a CONNECT message to return to the calling party.

A number of additional information elements that are exchanged in a pre-connect communications time period are well known, and defined within the ITU-T recommendations. While useful information may be communicated within the information elements presently provided by the defined ISDN standards, other information is desired. For example, a called party may often desire to know the reason that the connection is being requested by a calling party. Presently, no such information element is provided or defined by the ISDN specifications. Accordingly, there is a need to provide a system and method that can communicate additional calling information prior to the establishment of the call connection.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for communicating pre-connect information between a calling endpoint and a called endpoint in an Integrated Services Digital Network (ISDN) system. In accordance with one aspect of the present invention, the method includes the steps of dialing the called endpoint from the calling endpoint, and setting a calling party's subaddress information element to a value that allows the contents of a subaddress information field to be user specified. The method further includes the steps of specifying the contents of the subaddress information field, and transmitting the message of information to the called endpoint, the message of information including the calling party's subaddress information element.

In accordance with the preferred embodiment of the invention, the invention operates in a digital communication system that is compatible with the Open Systems Interconnection (OSI) seven layer model, and communication at the network layer of the OSI model is defined by ITU-T Q.931 specification. As defined by that specification, the subaddress information element can be user specified by setting a subaddress specifying field, which is a three bit field, to a binary value of "010". The subaddress information element, itself, may be encoded to define a message of information that includes information as to why the calling endpoint is placing the call. This information can include reasons such as the requested call is a dialed backup link, it is a forwarded or redirected call, it is informing the called party that a previously received call placed by the called endpoint was interrupted do to a fault condition on the interconnecting network link, etc. As is defined by the ITU-T specification, the foregoing information and information specifying elements are contained within a call SETUP message.

In accordance with a broader aspect of the present invention, a method is provided for communicating pre-connect information from a calling endpoint to a called endpoint in a digital telecommunications network (not necessarily ISDN). In accordance with this aspect, the method includes the steps of formulating a message requesting the establishment of a communication connection, and embedding within that message a user-defined element. The method further includes the steps of encoding the user-defined element with a bit sequence reflecting a particular information message, and then transmitting the formulated message to the called endpoint. As before, the message preferably is a SETUP message as defined by ISDN communication standards, and the user-defined element is a subaddress field.

In accordance with yet another aspect of the present invention, an apparatus is provided for operating at a called end point of a telecommunications network and determining whether to establish a communication connection with a requesting or calling endpoint. In accordance with this aspect of the invention, the apparatus includes a receiving means for receiving a message requesting the establishment of a communications connection. It includes a parsing means responsive to the receiving means for parsing the received message to identify an information-conveying element, the information-conveying element being bit encoded. The apparatus further includes a database or memory storage area for storing user information, wherein the user information is accessed by the bit encoded sequence of the information-conveying element. The apparatus also includes accessing means responsive to the parsing means for accessing the database means to retrieve a user information element that uniquely corresponds to the bit encoded information-conveying element. Analyzing means are provided for analyzing the retrieved user information element to determine from that element a reason defined by the user information element for the requested establishment of the telecommunications connection. Evaluating means evaluate whether the reason justifies a connection, and connecting means are responsive to the evaluating means for establishing a telecommunications connection with the calling party.

Having broadly defined these elements, it will be appreciated that elements such as the receiving means, parsing means, and connection means can be implemented by ways that are well known in the art. In a digital communications systems, and more specifically an ISDN system, the parsing means is merely a mechanism for determining the type and content of the message packet that is received by the called endpoint. In an ISDN implementation, the information conveying element is the calling party's subaddress element. This element is bit encoded, and the encoded bits may be used to access a memory storage element, such as a database or look up table, to retrieve information corresponding to the encoded bits that instruct the receiving apparatus as to the purpose for the call request. Both the analyzing means and the evaluating means will preferably be implemented by software to evaluate the reason that the call establishment is being requested, in light of calls that are presently connected to make a determination as to whether one of the presently existing calls should be terminated so as to permit connection with the requesting calling endpoint.

To illustrate, suppose both the calling and called end points are communicating across a data link. At some point during this communication, assume that the calling endpoint detects a fault in the transmission link between the two units. The calling endpoint may then transmit a SETUP message requesting a separate transmission link between the two units for continuing the communication between the two. Accordingly, one bit encoded sequence may be provided to identify that this particular event (i.e., fault) has occurred. Upon receiving and decoding this message, the called endpoint could then determine to terminate its present connection with the calling endpoint and set up a new, separate connection therewith for continued communication.

DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Having summarized the present invention above, it will be appreciated that the concepts and teachings of the present invention may be applied to various alternative embodiments. However, the preferred embodiment of the invention relates to digital communications across an ISDN telecommunication connection, the communications formulated in accordance with the ITU-T specifications, and more specifically the ITU-T Q.931 specification. Accordingly, the description provided herein will focus on ISDN communications. As previously described, ISDN communications are characterized by time-multiplexed B and D channels, wherein the B channels carry data and the D channel carries control and signaling information. The present invention, as implemented in an ISDN system, is concerned with pre-connect message exchanges across the D channel.

Figure 1A:
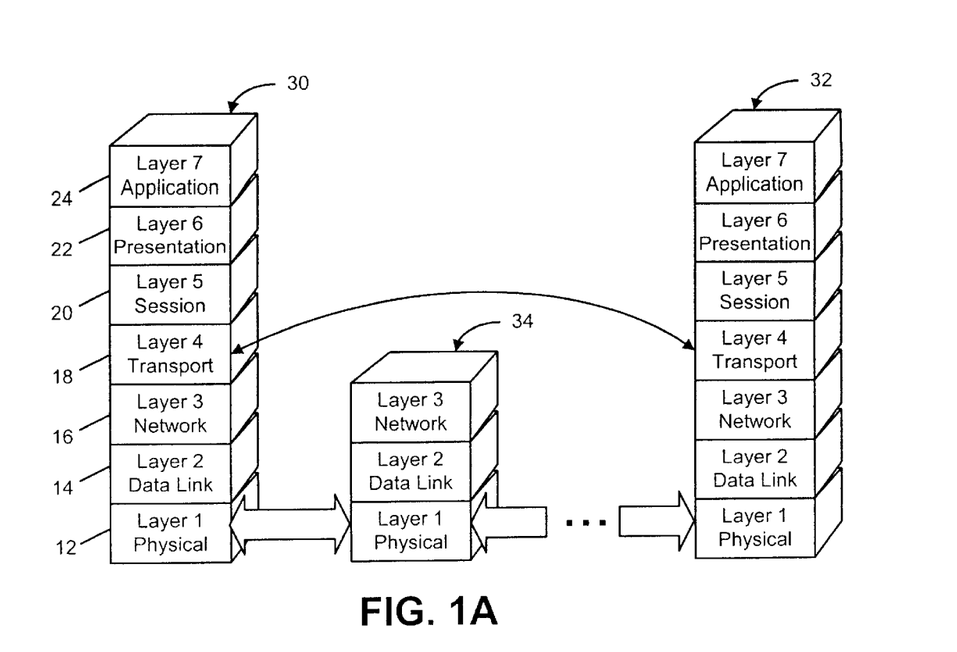
FIG. 1A is a diagram illustrating ISDN communications in connection with the OSI seven layer model.
Figure 1B:
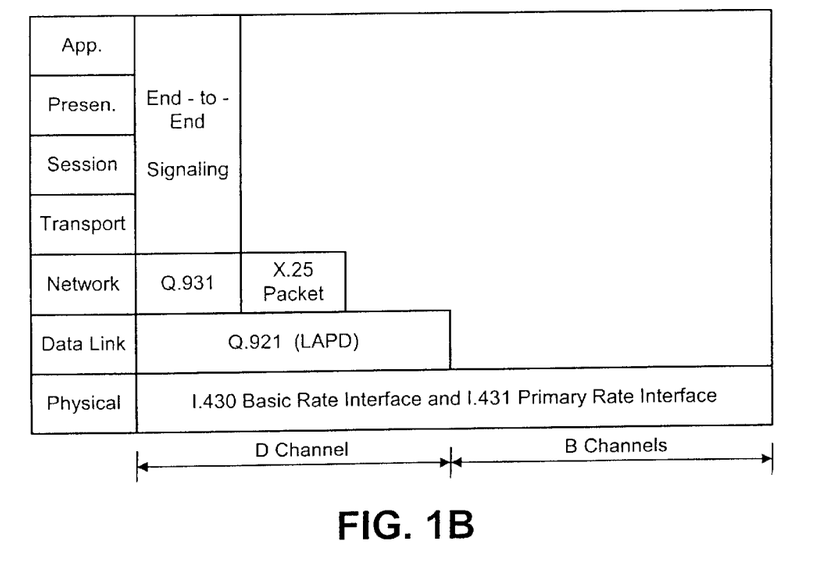
FIG. 1B is a diagram illustrating layered D channel ISDN communications in connection with the seven layer OSI model.

Turning now to the drawings, FIGS. 1A and 1B are diagrams that illustrate ISDN communications in accordance with the seven-layer OSI model. As is now well known, layer one 12 is the physical layer, which is concerned with the transmission of unstructured bit streams over a physical link. The physical layer 12 involves parameters such as signal voltage swing and bit length or duration. It further deals with the mechanical, electrical, and procedural characteristics necessary to establish, maintain, and deactivate a physical link. Layer two 14 is the data link layer, which is responsible for providing the dependable communication of data across the physical link. In this regard, it transmits blocks of data with the necessary synchronization, error control, and flow control. Layer three 16 is the network layer. The network layer 16 is responsible for establishing, maintaining, and terminating connections, and it insulates the upper layers from the details or burden of data transmission. Layer four 18 is the transport layer, which serves to provide dependable transfer of data between endpoints. Error recovery and flow control are also provided within layer four 18. Layer five 20 is the session layer. The session layer operates to establish, maintain, and terminate connections, or sessions, between applications running at the endpoints and intercommunicating with one another. In this regard, it provides the control structure for communicating between the end point applications. Layer six 22 is the presentation layer, which operates to perform data transformation in order to provide a standardized application interface, and to provide common communication services. Finally, layer seven 24 is the application layer which provides services to the users of the OSI-compliant system. Network management transaction servers and file transfer protocols are examples of application layer services.

While FIGS. 1A and 1B illustrate the entire seven-layer model, the present invention is concerned with D channel communications that primarily take place at the network layer 16. FIG. 1A illustrates the connection and communication between two end points 30 and 32 through one or more intermediate device 34. In this regard, it is appreciated that the applications executing on the end points 30 and 32 are compliant with the seven-layer OSI model. As is well known, intermediate devices need not employ all seven layers. Instead, they may employ only the physical layer 12 (such as repeaters), only the physical 12 and data link 14 layers (such as host devices), or the physical 12, data link 14, and network 16 layers (such as gateways and routers). In this regard, the first three layers are often referred to collectively as the physical layers. The transport layer of layer four 18, as previously mentioned, is responsible for end to end communications. An example of a layer four communications protocol is Transport Control Protocol (TCP). In accordance with TCP, a device 30 may specify a communication to be directed to endpoint device 32. Intermediate devices 34 are responsible for ensuring that the communication packet is received by device 32.

Referring to FIG. 1B, a diagram illustrates various ITU-T specifications or recommendations, in relation to the layers of the OSI model. Specifically, the I.430 basic interface and the I.431 primary interface recommendations specify physical layer transfer-transactions. The basic rate interface and primary rate interface for ISDN transmissions have been briefly described above, and will not be repeated here as it is not central to an understanding of the present invention. ITU-T specification Q.921 (LAPD) is provided for D channel communications at the data link layer. (Note that the 430 and 431 specifications or recommendations cover both D and B channels). Finally, and pertinent to the present invention, ITU-T specification Q.931 governs network layer transactions for control signaling of the D channel. It will be appreciated that this specification and the preferred embodiment of the present invention are directed to circuit-switched applications. For packet-switched circuits, X.25 protocol standard is provided for governing D channel signaling.

Figure 2A:
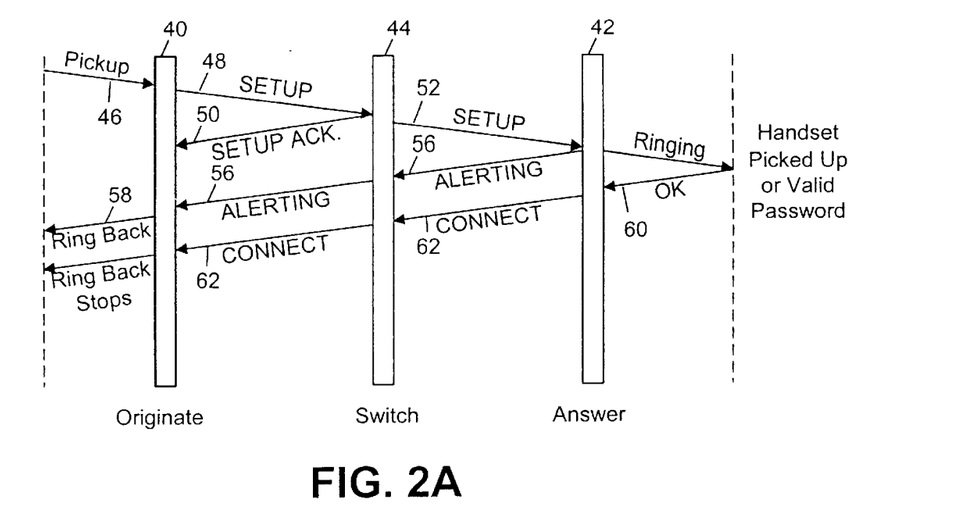
FIG. 2A is a timing diagram illustrating the pre-connect messages transmitted in an ISDN communication link, depicting a successful connection between a calling point and called endpoint.
Figure 2B:
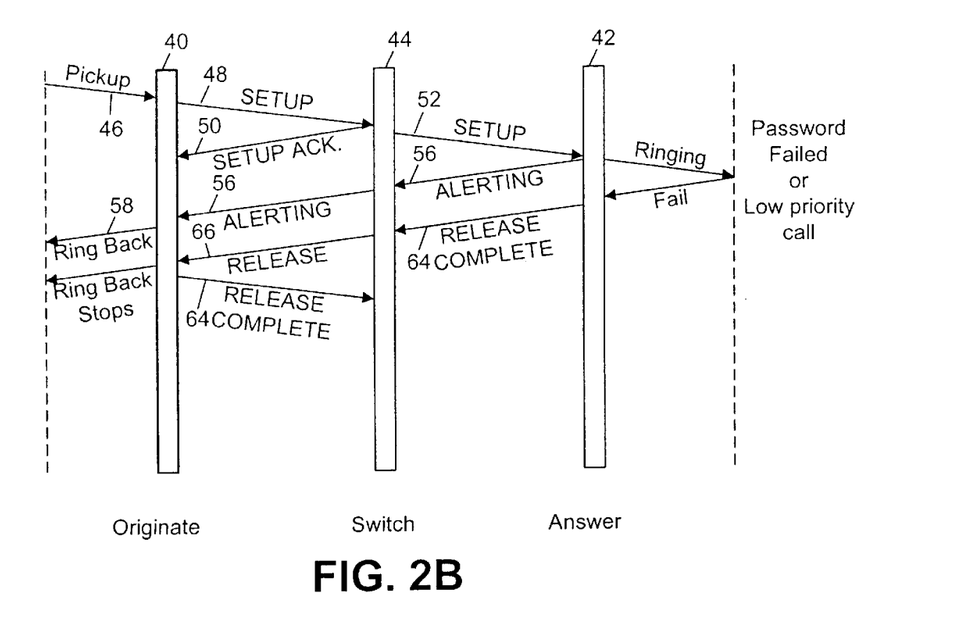
FIG. 2B is a timing diagram similar to FIG. 2A but depicting a failure to establish a connection between a calling and called end point.

Turning now to FIGS. 2A and 2B, timing diagrams illustrating both a successful and a failed connection attempt are illustrated. More particularly, FIG. 2A illustrates the principal message transmissions in an ISDN network for establishing a call connection between an originate peer 40 and an answer peer 42, through one or more intermediate switches or exchanges 44. The dashed lines on each end of the network depict either a human interface or a computer interface. That is, for purposes of illustration, the timing diagrams reflect signaling that occurs in ISDN communications, whether the endpoints interface with humans (i.e., a telephone with a handset) or a computer. As will be appreciated, however, in many embodiments, there will be no human interface, in the sense of a person lifting a handset on a telephone, but rather the entirety of the communications sequence will be handled by computer.

In keeping with the description of FIG. 2A, the sequence starts when a person, for example, lifts a telephone handset (not shown). This act causes the generation of the pickup signal 46. Assuming the telephone is ISDN-compatible, it ensures that the D channel is active before generating a dial tone. The person then keys in the telephone number to be called, and the telephone unit accumulates and stores the digits until all are keyed in. At that time, the unit 40 transmits a SETUP message over the D channel to the local exchange (illustrated as switch 44). Included within the SETUP message 48 are the destination number, and a channel identification which specifies the B channel that is to be used during the communication. Upon receiving the SETUP message, the local exchange or switch 44 transmits a setup acknowledge message 50, back to the originate peer 42, which acknowledges the receipt of the SETUP message. The switch 44 also propagates or retransmits the SETUP message (possibly through one or more intervening exchanges) to the answering peer 42 or called party. One function of the local exchange 44 is to include or add to the SETUP message 52 the caller ID information for the originating caller.

Once the answering peer point 42 receives the SETUP message 52, it transmits an alerting message 56, which is propagated all the way back to the originate caller 40. Upon receiving the alerting message 56, the originate caller transmits a ring back signal 58 to the human interface. At the answering peer 42, the receipt of the SETUP message 52 causes the telephone to ring (if there is a telephone interface). By a person lifting the handset on a telephone, or a computer answering the call, a pickup signal 60 is transmitted to the answer peer 42 which causes a connect signal 62 to be propagated back to the originate peer 40.

Alternatively, and as mentioned above, in embodiments consistent with the present invention, the human interface will not be present at the answering peer 42. Instead, a computer or processor will interface with peer 42 to receive the SETUP message and parse it, so as to evaluate various of its component parts. Specifically, the processor associated with the answering peer 42 may evaluate a password that is included with the SETUP message (as is known in the art) to evaluate whether a connection signal should be transmitted, so as to establish a connection with the originate peer 40. Alternatively and as will be discussed in more detail herein, the processor at the receiving node 42 may evaluate a user-defined element contained within the SETUP message 52 to assess the reason that the calling party at originate peer 40 is seeking to establish a connection with the answering peer 42. This call requesting information may then be compared against similar information for presently existing calls at the answer node, as part of a prioritization scheme. If the incoming call is evaluated to have a higher priority than one or more existing calls, consistent with the present invention, the answer peer 42 may terminate a presently existing call in order to establish the connection with the originate peer 40.

FIG. 2B shows a timing diagram similar to that shown in 2A, except that FIG. 2B illustrates the sequence that occurs if the processor at the answering peer 42 determines not to establish a connection with the originate peer 40. This decision, as described above, may be based upon a failed password, or an incoming call request having lower priority than any presently existing calls, and an inability of the answer peer 42 to accept any further calls. In any event, in a situation in which the answer peer 42 wishes to reject the incoming call, it transmits a RELEASE COMPLETE signal 64 which is propagated through switch 44 as RELEASE COMPLETE 66 to the originate peer 40. The originate peer 40 then transmits a RELEASE COMPLETE signal 68 back to the switch 44, as a way of acknowledging that it has received the release signal from the answer peer 42. It will be appreciated that the various connect signals mentioned above, including SETUP, SETUP ACKNOWLEDGE, ALERTING, CONNECT, RELEASE and RELEASE COMPLETE are well documented and described in the ISDN ITU-T Q.931 specification, and need not be further described herein.

Figure 3A:
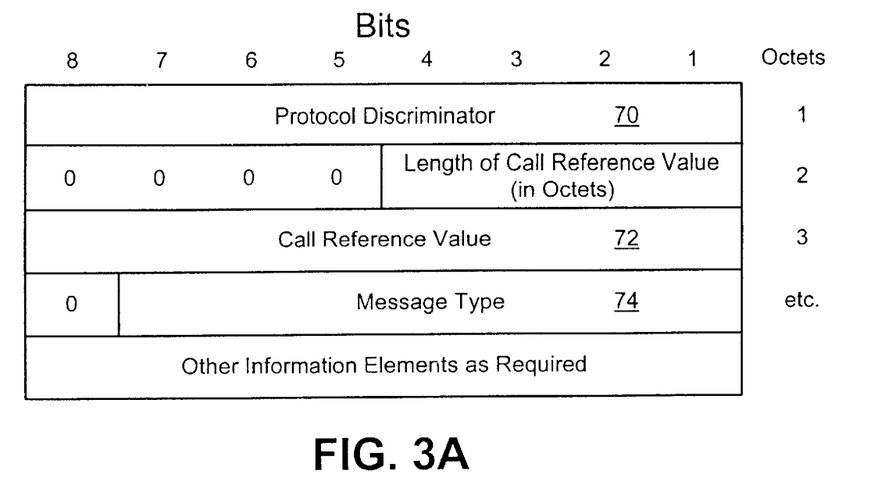
FIG. 3A is a diagram illustrating the message packet structure in accordance with the ITU-T Q.931 specification.

Turning now to FIG. 3A, a diagram illustrating the general message organization of an ISDN message is shown. The message is illustrated in octets, each octet including bits 1–8, where bit one is transmitted first followed by bits 2, 3, 4, etc. In the same fashion, the first octet is transmitted first followed by the second and third, etc. The protocol discriminator 70, the call reference value 72, and the message type elements are common to all messages, and will always be present. The message type element is specific or unique to each message type. The purpose of the protocol discriminator 70 is to distinguish messages for user-network call control from other messages (to be defined). It also distinguishes messages of the ITU-T Q931 specification from those OSI network layer protocol units that are coded to other specifications or standards.

The call reference value 72 identifies the call or facility registration-cancellation request at the local user-network interface to which the particular message applies. The call reference does not have end-to-end significance across ISDN's. The call reference value 72 is the second part of every message, and its length is indicated in bits 1–4 of octet number 2. At a minimum, all networks and users must be able to support a call reference value of one octet for a basic user-network interface and a call reference value of two octets for a primary rate interface.

The purpose of the message type element 74 is to identify the function of the message currently being sent. The message type element 74 is the third part of every message, and bits 1–5 are encoded to define a call establishment message in accordance with Table 1 below.

TABLE 1

| Bits | | | | | | | | |
|---|---|---|---|---|---|---|---|---|
| 8 | 7 | 6 | 5 | 4 | 3 | 2 | 1 | Call Establishment Message |
| 0 | 0 | 0 | 0 | 0 | 0 | 0 | 1 | Alerting |
| 0 | 0 | 0 | 0 | 0 | 0 | 1 | 0 | Call Proceeding |
| 0 | 0 | 0 | 0 | 0 | 1 | 1 | 1 | Connect |
| 0 | 0 | 0 | 0 | 1 | 1 | 1 | 1 | Connect Knowledge |
| 0 | 0 | 0 | 0 | 0 | 0 | 1 | 1 | Progress |
| 0 | 0 | 0 | 0 | 0 | 1 | 0 | 1 | Setup |
| 0 | 0 | 0 | 0 | 1 | 1 | 0 | 1 | Setup Acknowledge |

The format, use, and operation of each of the call establishment messages set out in Table 1 are well known and defined in the ITU-T Q.931 specification, and they need not be described herein.

Figure 3B:
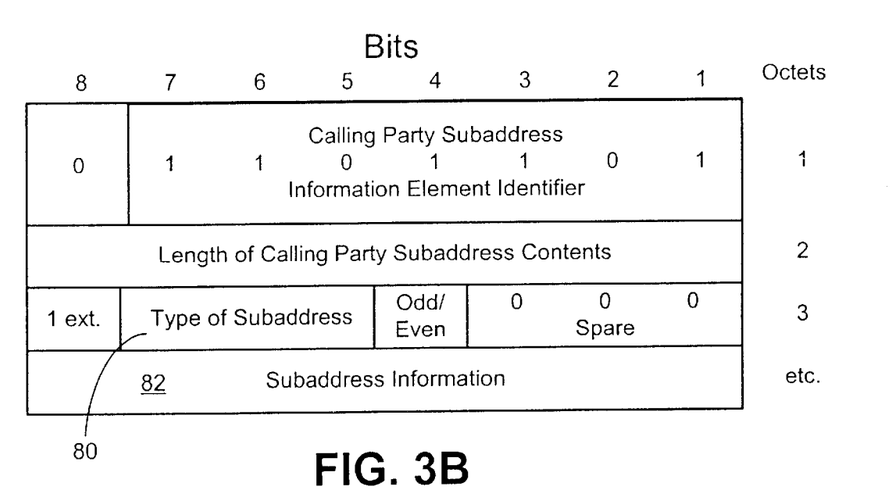
FIG. 3B is a diagram illustrating the subaddress information element of a calling party in accordance with the ITU-T Q.931 specification.

Referring now to FIG. 3B, a diagram is shown depicting a portion of a call SETUP message. Specifically, a portion of the call SETUP message includes the caller ID (i.e., number of a calling party, as well as the calling party subaddress information.) Generally, as mentioned above, the calling party subaddress information is used to identify extensions, LAN terminal addresses, or other terminating points at a multi-point connecting endpoint. Although four octets of the element are illustrated, it is known, as defined by the Q.931 specification, that the calling party subaddress element has a maximum size of 23 octets. While the general format and contents of this element are described in the Q.931 specification, the present invention employs a unique utilization for a portion of this element. Specifically, according to the Q.931 specification, the subaddress information format is dictated by the "Type of Subaddress" field 80. This is a three bit field that, when set to a binary value of "010", defines the contents of the subaddress information field 82 to be user specified, and therefore not defined or restricted by the Q.931 specification. The present invention, therefore, has utilized the subaddress information field 82 in accordance with the format shown in FIG. 3C.

Figure 3C:
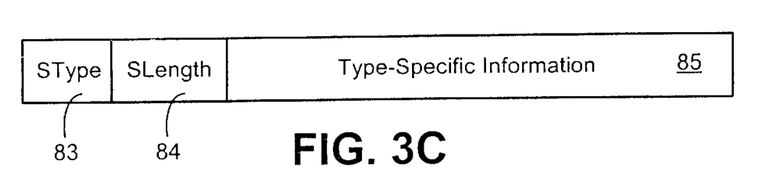
FIG. 3C illustrates the components of the Subaddress Information field illustrated in FIG. 3B.

Specifically, the subaddress information field 82 is partitioned into three subfields: the SType subfield 83, the Slength subfield 84, and the Type-Specific information field 85. The first bit field denoted as SType is a bit field which defines the information conveyed by and contained in the calling party's subaddress information field 82. If the value of this bit field is a 0, it indicates that a password is contained in the type-specific information field 85. (When first introducing the calling party the subaddress field indicates that it comprises three subfields, an SType field 83 and SLength field 84 and a type-specific information field 85). The answering unit, which will preferably be compatible with the originating unit, is responsible for validation of the password. As illustrated in FIG. 2B, if a received password is not valid, the call is terminated with a RELEASE COMPLETE message, and all other bits in the SType bit field 83 are ignored. The length of the password is indicated in the SLength field 84. When the SType password bit field is set, the alarm and user command bits (discuss below) may not be set. Bit number 1 of the SType bit field 83 is an alarm bit. This bit indicates that an alarm code is contained in the type specific information field 85. Once the answering unit has received this message, it terminates the call with a RELEASE COMPLETE message (with a cause value of normal, call clearing). The length of the alarm code is indicated in the SLength field 84. When the SType alarm is set, the password and user command bits may not be set.

Bit 2 in the SType bit field 83 is a command bit. This bit indicates that a user-specific command code (such as enable or disable) is contained in the type-specific information field 85. Once the answering unit has received this message it terminates the call with a RELEASE COMPLETE message, with a cause value of normal, call clearing. As in the case of the password and alarm bits, when the SType user command bit is set, the password and alarm bits may not be set.

Bit 3 of the SType bit field 83 is called the "keep alive" bit. This bit may be sent on a periodic basis to indicate to the answering peer that the originating peer is alive and functional. This bit, unlike those described above, may appear in conjunction with any other valid bit combination. Finally, bit 4 is the callback bit, and when this bit is set, the answering peer will terminate the current call and call back the originator of the current call (using the caller ID number provided in the SETUP message). This mechanism can be used, for example, to centralize billing of ISDN calls. For example, suppose a corporate entity has a number of facilities that intercommunicate on a continual basis. Further assume that many of these corporate facilities are separated by long distances, thus requiring long distance telephone calls to establish connections. It may be desirable to centralize the billing for such telephone usage at a central facility. Therefore, if a satellite facility is calling the central facility, rather than accept the call request or SETUP message, setting the callback bit will instruct the central facility to reject the call, by way of a release complete command, and dial back the calling or satellite facility. In this way, the central facility will be billed for the telephone call. The SLength element 84 specifies the length of the type specific information field 85. The type specific information field contains data associated with certain bits in the SType field 83.

It should be appreciated that the bit values given above in connection with the subaddress information field 82 are presented for purposes of illustration and reflecting only a single embodiment of the present invention. In fact, consistent with the concepts and teachings of the present invention, the subaddress information field 82 may be formatted in any of a number of ways. For example, and in keeping within the description above, it may be a single octet that, by virtue of encoding, may define two hundred fifty six different commands, request, instructions, units of information, etc. As will be discussed further below, a look-up table, database, or other decoding device may be provided in connection with the answering unit to decode an encoded subaddress information field 82, in order to determine the particular message of contents associated with that field. In addition to password protection, setting alarm status, indicating a callback, it will be appreciated that a variety of information may be predefined within this subaddress information field 82. Indeed, by lengthening the variable link subaddress information field 82 to a two octet field (16 bits) over 65,000 different combinations of information may be encoded in this field. As a result, a variety of messages may be encoded in stored and look-up tables which allows an answering peer 42 to communicate with an originate peer 40 without ever having to establish a permanent connection, and therefore incur charges for the call.

Listed are a few examples of messages that may be encoded and exchanged in the manner described above: an authentication message, which contains a password that further identifies the caller and provides an extra level of security; an identification message that contains a generic or specific identification of the type of device which placed the call (i.e., calling party device type); a heartbeat poll message, which indicates the basic status of the calling device (the called device may expect to receive such a message periodically and may initiate recovery measures in the event of a missed poll); a configuration message, which communicates a very basic set of information used to remotely configure the called device; an alarm message which indicates that the calling party device has set or cleared an alarmable condition; a remote statistics message, which communicates a basic set of statistics, such as quality of service parameters for a primary connection between two devices; a call resume message, which indicates that the caller has redialed a previously placed call that was interrupted; A call request message, which indicates a request for callback from the originating device; and a command message which is used to communicate a basic set of commands between devices. It should be appreciated that this is not an exhaustive listing, but is illustrative of a few messages that may be encoded for pre-charge exchange between a calling and called device.

Figure 4:
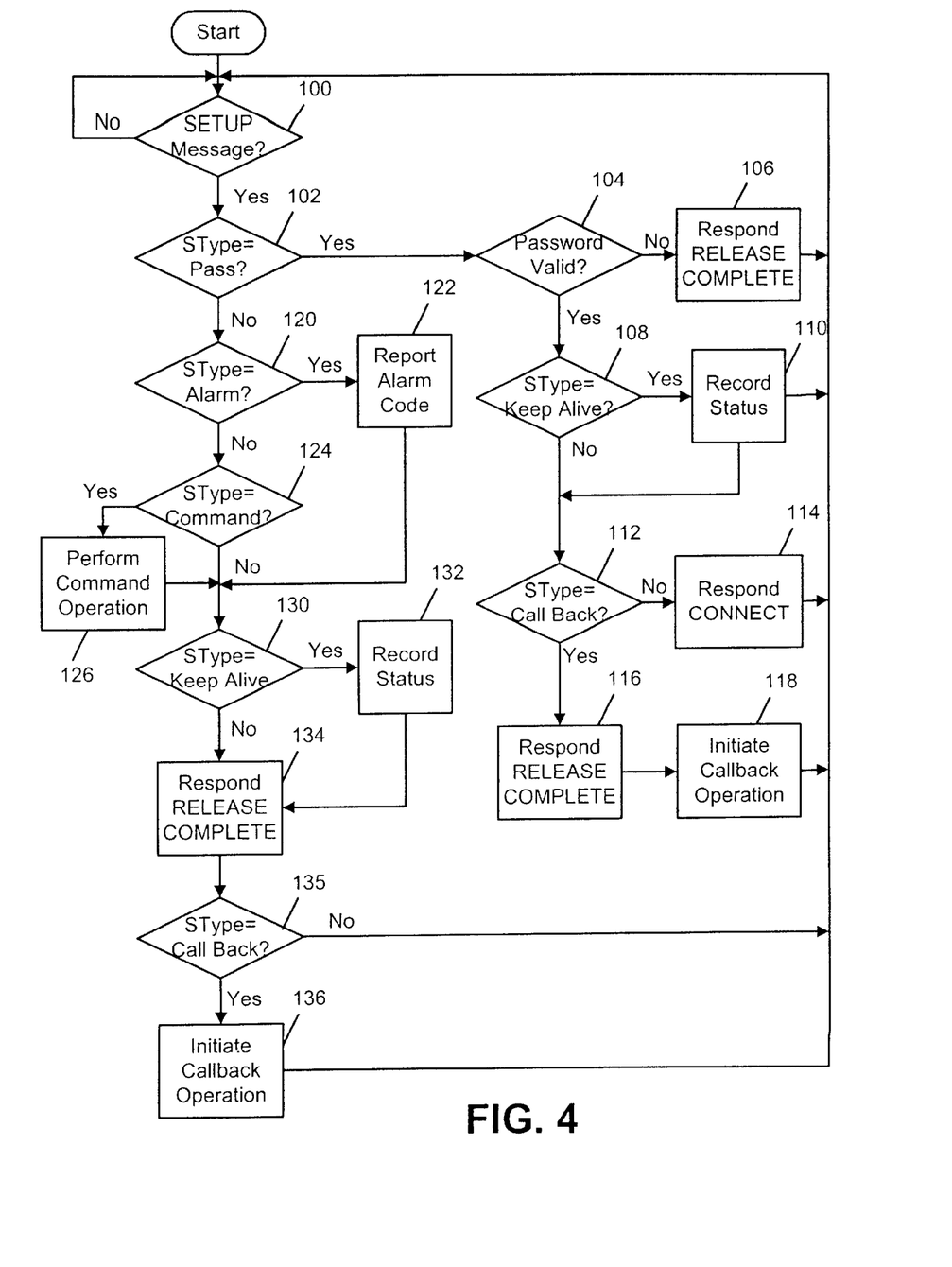
FIG. 4 is a software flowchart illustrating the top-level operation of a system constructed in accordance with the present invention.

Referring now to FIG. 4, a software flowchart illustrating the top-level operation of an answering peer constructed in accordance with the embodiment discussed above, wherein the subaddress information field 82 is partitioned into SType 83, Slength 84, and type-specific information 85 fields. At step 100, the system awaits the receipt of a SETUP message. Upon receiving a SETUP message, the system looks to determine whether the SType bit field is set for a password (step 102). If so, the system proceeds to set 104 where it determines whether the password is valid. If not, the system issues a RELEASE COMPLETE message and returns to step 100. If, however, the password is valid, the system proceeds to step 104 where it evaluates the SType, keep-alive bit field (step 108). If this bit field reflects that the call is to be kept alive, the system records the status at step 110 and then proceeds to step 112, which is the same step proceeded to if step 108 resolves to false or NO. Step 112 evaluates the SType field to determine whether it has specified a callback command. If not, the system responds by issuing a CONNECT command at step 114, to allow connection with the originating call. If, however, the SType field reflects a callback command, then the system transmits a RELEASE COMPLETE message (step 116) and initiates callback operation at step 118.

If the decision at step 102 resolves to NO, then the system proceeds to step 120 where it evaluates the SType field for the alarm condition. If the alarm condition is active, the system reports the alarm code and proceeds to step 130 (step 122). If not, the system evaluates the command field of the SType bit field (step 124). If the command field specifies a user command, then the system performs the command operation at step 126 and procees to step 130. If step 124 resolves to NO, then the system proceeds directly to step 130.

At step 130, the system evaluates the SType bit field to determine if the keep alive bit is set. If so, it records this status at step 132 and proceeds to step 134. If the keep alive bit is not set, then the system proceeds directly to step 134, where it responds by issuing a RELEASE COMPLETE message that is transmitted back to the call originator. Thereafter, the system proceeds to step 135, where it evaluates the SType bit field for a callback command. If a callback command is specified, then at step 136, the system will initiate callback operation (having already issued the RELEASE COMPLETE command).

Figure 5:
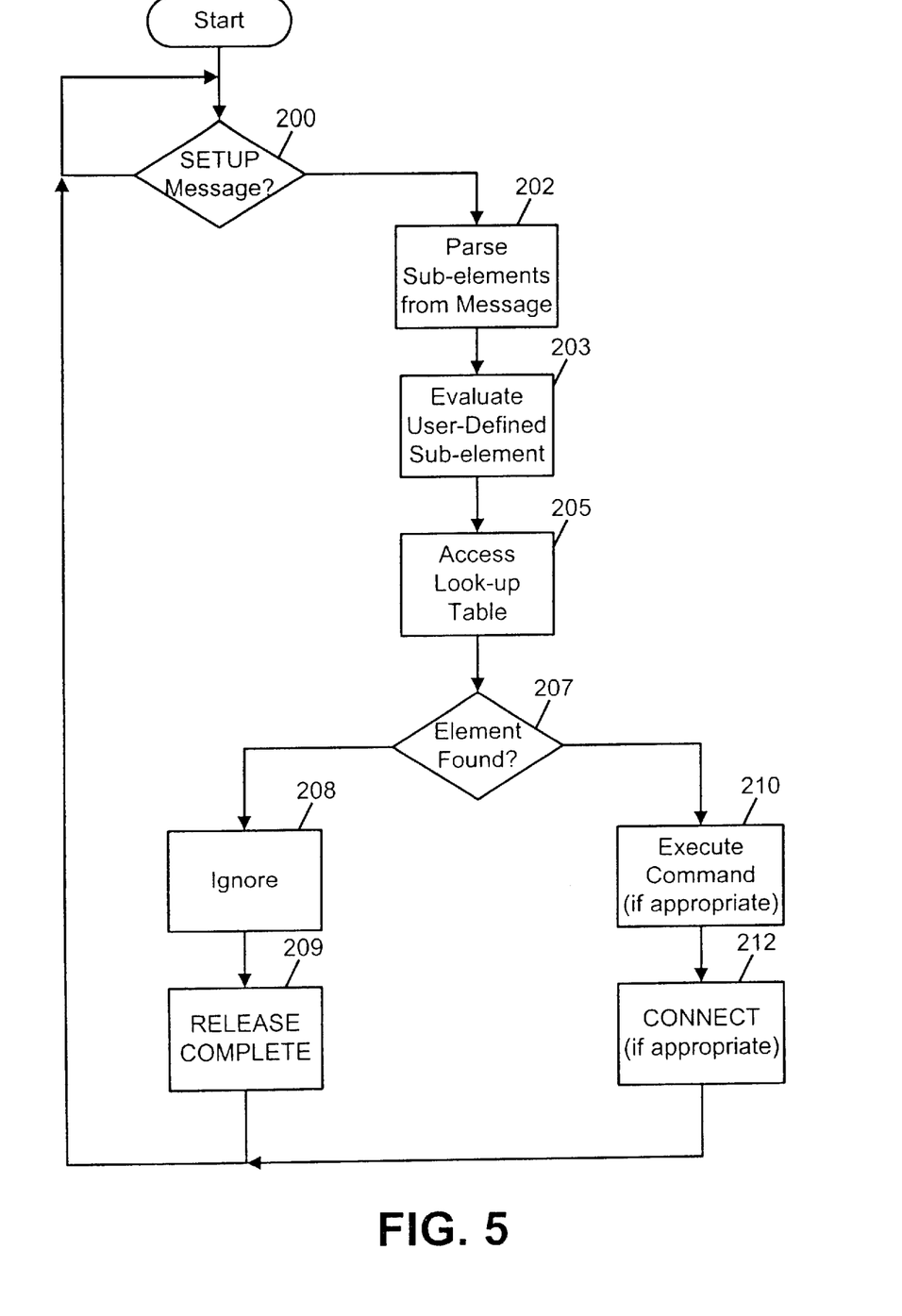
FIG. 5 is a software flowchart illustrating the top-level operation of a receiving unit constructed in accordance with the present invention.

Reference is now made to FIG. 5 which shows a top-level software flowchart illustrating the operation of a receiving unit constructed in accordance with the present invention. Beginning at step 200, the system waits for the receipt of an incoming SETUP message. Upon receiving a SETUP message it proceeds to step 202 where it parses the message into the various subelements. The system then evaluates a user defined subelement or user specified subelement at step 203. Preferably this element is encoded. Therefore the system access a database or look-up table (step 205) to determine whether the particular user specified element exists within the receiver unit database. If not, the system (at step 207) determines that the user-defined element specifies an invalid command, causing the system to ignore the command and preferably transmit a RELEASE COMPLETE message (step 209), therefore not establishing the connection. If, however, the command is found in the look-up table, step 207 resolves to YES and the system executes the command (step 210) if appropriate and transmits a CONNECT (step 212) to establish a connection with the originating caller.

Figure 6:
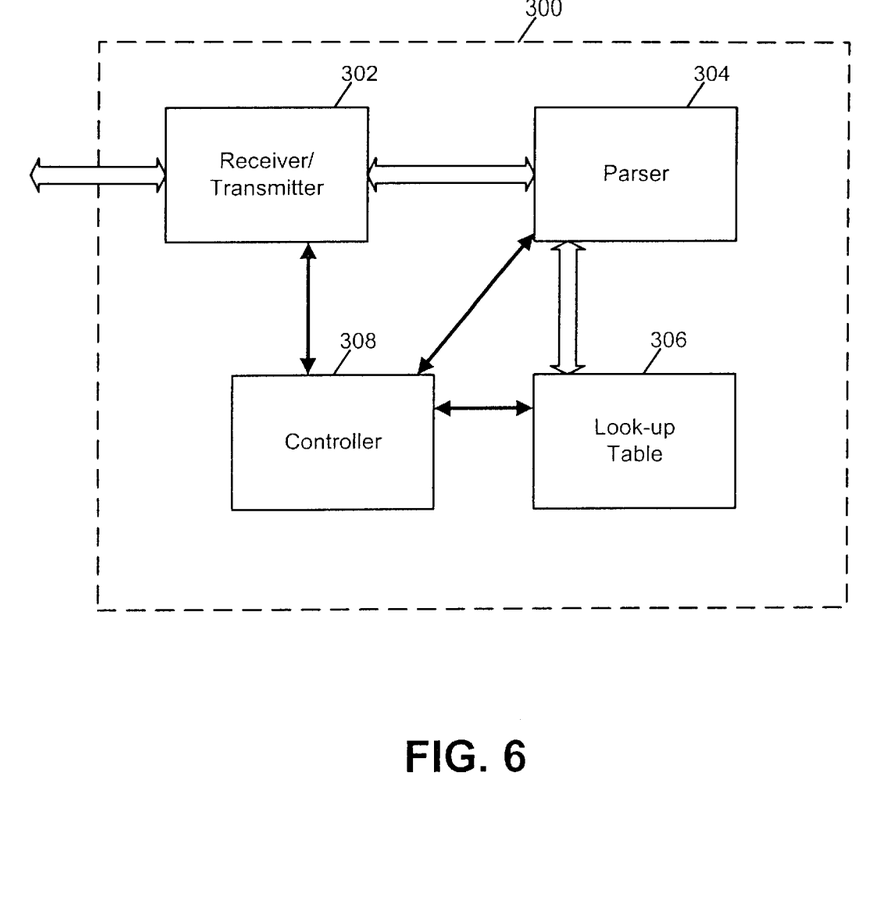
FIG. 6 is a block diagram illustrating the primary function blocks associated with a receiver constructed in accordance with the present invention.

Finally, references made to FIG. 6 which illustrates a top-level block diagram of a receiving unit 300 constructed in accordance with the invention. At the top-level, the receiving unit includes a receiver/transmitter 302, a parser 304, a look-up table or other storage area 306 and a controller 308. The receiver/transmitter 302 is used for both receiving messages from a remote unit and transmitting messages to a remote unit. Responsive to the receiver/transmitter 302, a parser 304 functions to parse the various subelements of, for example, a received SETUP message into its constituent elements. A look-up table 306 communicates with the parser 304 and may be controlled to look up certain user specified subelements (e.g., the subaddress information element 82 of FIG. 3B.) Each of these functional blocks may operate under the control of a centralized controller 308, which may, for example, be a microprocessor.

Not shown in FIG. 6 are various other elements, which may include an execution unit to execute a user-specified command, the existence and operation of which will be appreciated by those skilled in the art.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for communicating pre-connect information between a calling endpoint and a called endpoint in an integrated services digital network (ISDN) system, comprising the steps of:
  dialing the called endpoint;
  setting a calling party subaddress information element to a value that allows the contents of a subaddress information field to be user specified;
  specifying the contents of the subaddress information field to specify a reason for the calling party dialing the called endpoint;

transmitting a message of information to the called endpoint, the message of information including the calling party subaddress information element and the subaddress information field;

receiving the message of information at the called endpoint;

comparing the reason the calling party dialed the called endpoint to a database of calling reasons;

transmitting a connect message from the called endpoint to the calling party, if the reason the calling party dialed the called endpoint corresponds to at least one of the calling reasons; and transmitting a release complete message from the called endpoint to the calling party, if the reason the calling party dialed the called endpoint does not correspond to at least one of the calling reasons.

2. An apparatus for determining whether to establish a telecommunications connection with a requesting endpoint comprising:

receiving means for receiving a message requesting the establishment of a telecommunications connection;

parsing means for parsing the received message to identify an information-conveying element, the information-conveying element being bit encoded;

database means for storing user information, the user information being accessed by the bit encoded sequence of the information-conveying element;

accessing means responsive to the parsing means for accessing the database means to retrieve a user information element that uniquely corresponds to the bit encoded information-conveying element;

analyzing means for analyzing the retrieved user information element to determine a reason defined by the user information element for the requested establishment of the telecommunications connection;

evaluating means for evaluating whether the reason justifies connection; and connection means responsive to the evaluating means for establishing a telecommunications connection with the calling party.

3. The apparatus as defined in claim 2, wherein the evaluating means includes determining means for determining whether an existing telecommunications connection with a third party should be terminated, to permit the requested connection.

4. The apparatus as defined in claim 3, further including terminating means responsive to the determining means for terminating an existing connection.

5. The apparatus as defined in claim 2, wherein the message is a SETUP message, as defined by ITU-T Q.931 specification.

6. The apparatus as defined in claim 5, wherein the information-conveying element is a subaddress element.

7. The apparatus as defined in claim 2, wherein the database means includes a look-up table.

8. The apparatus as defined in claim 2, wherein the database means includes a memory storage area.

9. The apparatus as defined in claim 2, wherein the reason includes one or more selected from the group consisting of:

dialing a backup link;

a call previously received by the calling endpoint from the called endpoint was interrupted due to a fault condition on the interconnecting network link;

redirecting a phone call;

an authentication message including a password;

an identification message including an identification of the calling party device;

a heartbeat poll message, indicating the status of the calling party device;

a configuration message including information for configuring the called party device;

an alarm message including information indicative of an alarm status in the calling party;

a remote statistics message;

a call resume message including information indicating that the calling party has redialed a previously interrupted call;

a call request message, including information requesting a callback; and a command message, including a basic set of commands.

10. The apparatus as defined in claim 5, wherein the information-conveying element is a subaddress element.

11. A system for communicating pre-connect information from a calling endpoint to a called endpoint in an integrated services digital network (ISDN) system comprising:

a first computer at the calling endpoint, the first computer configured to formulate a SETUP message for communicating to the called endpoint;

a second computer at the called endpoint, the second computer configured to receive the SETUP message;

first means at the first computer for setting a calling party subaddress type field of the SETUP message to a unique specified value, wherein the unique specified value indicates a subaddress information element to be user-defined;

second means at the first computer for setting a user-specified value of the subaddress information element, wherein the user-specified value is encoded to correspond with at least one information message selected from the group consisting of: dialing a backup link; a call previously received by the calling endpoint from the called endpoint was interrupted due to a fault condition on the interconnecting network link; an authentication message including a password; a heartbeat poll message, indicating the status of the calling party device; a configuration message including information for configuring the called party device; an alarm message including information indicative of an alarm status in the calling party; a remote statistics message; a call resume message including information indicating that the calling party has redialed a previously interrupted call, and; a command message, including a basic set of commands;

third means at the second computer for evaluating the subaddress type field of the SETUP message; and fourth means at the second computer for decoding the subaddress information element when the subaddress type field is the unique specified value, wherein the fourth means includes a lookup table of the information messages for identifying a reason that the calling endpoint is attempting to establish a communication link with the called endpoint.

12. The method of claim 1, wherein the database of calling reasons comprises at least one of the calling reasons selected from the group consisting of: dialing a backup link; a call previously received by the calling endpoint from the called endpoint was interrupted due to a fault condition on the interconnecting network link; an authentication message including a password; a heartbeat poll message, indicating the status of the calling party device; a configuration message including information for configuring the called party device; an alarm message including information indicative of an alarm status in the calling party; a remote statistics message; a call resume message including information indicating that the calling party has redialed a previously interrupted call, and; a command message, including a basic set of commands.

* * * * *